(12) United States Patent
Xu et al.

(10) Patent No.: US 9,124,959 B2
(45) Date of Patent: Sep. 1, 2015

(54) HIGH CONNECTIVITY MULTIPLE DIMENSION OPTICAL NETWORK IN GLASS

(71) Applicant: Telefonaktiebolaget L M Ericsson (publ), Stockholm (SE)

(72) Inventors: Qing Xu, Montreal (CA); Robert Brunner, Montreal (CA); Stephane Lessard, Mirabel (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 102 days.

(21) Appl. No.: 13/959,249

(22) Filed: Aug. 5, 2013

(65) Prior Publication Data
US 2015/0037032 A1    Feb. 5, 2015

(51) Int. Cl.
| | |
|---|---|
| H04B 10/00 | (2013.01) |
| H04Q 11/00 | (2006.01) |
| H04L 12/933 | (2013.01) |
| B23K 26/00 | (2014.01) |
| G02B 6/12 | (2006.01) |
| G02B 6/125 | (2006.01) |
| H04J 14/00 | (2006.01) |

(52) U.S. Cl.
CPC ........ *H04Q 11/0005* (2013.01); *B23K 26/0054* (2013.01); *G02B 6/12002* (2013.01); *G02B 6/125* (2013.01); *H04L 49/1515* (2013.01); *G02B 2006/12171* (2013.01)

(58) Field of Classification Search
CPC ............... H04B 10/25; H04B 10/2504; G02B 6/12002; H04Q 11/0005
USPC ........................................................... 398/50
See application file for complete search history.

(56) References Cited

U.S. PATENT DOCUMENTS

| | | | |
|---|---|---|---|
| 6,573,026 B1 | 6/2003 | Aitken et al. | |
| 8,270,788 B2 | 9/2012 | Herman et al. | |
| 2003/0031419 A1 | 2/2003 | Simmons et al. | |
| 2005/0041906 A1 | 2/2005 | Sugama et al. | |
| 2013/0188971 A1* | 7/2013 | Painchaud | 398/214 |
| 2014/0153922 A1* | 6/2014 | Ryf et al. | 398/44 |

FOREIGN PATENT DOCUMENTS

| | | | |
|---|---|---|---|
| DE | 102008036398 B3 | 11/2009 | |
| WO | 0211251 A2 | 2/2002 | |

* cited by examiner

*Primary Examiner* — Daniel Dobson
(74) *Attorney, Agent, or Firm* — Murphy, Bilak & Homiller, PLLC

(57) ABSTRACT

An optical communications system includes a first plurality of optical components having optical ports, a second plurality of optical components having optical ports and an optical cross-connect. The optical cross-connect includes a block of a single continuous construction and material having a first side adjacent the first optical components and a second side adjacent the second optical components, and a plurality of non-intersecting, continuous waveguides formed within the block and extending from the first side of the block to the second side of the block. The refractive index of each waveguide is different than the surrounding material of the block, and each waveguide changes direction at least once within the block. The waveguides are optically aligned with the optical ports of the first optical components at the first side of the block and with the optical ports of the second optical components at the second side of the block.

21 Claims, 15 Drawing Sheets

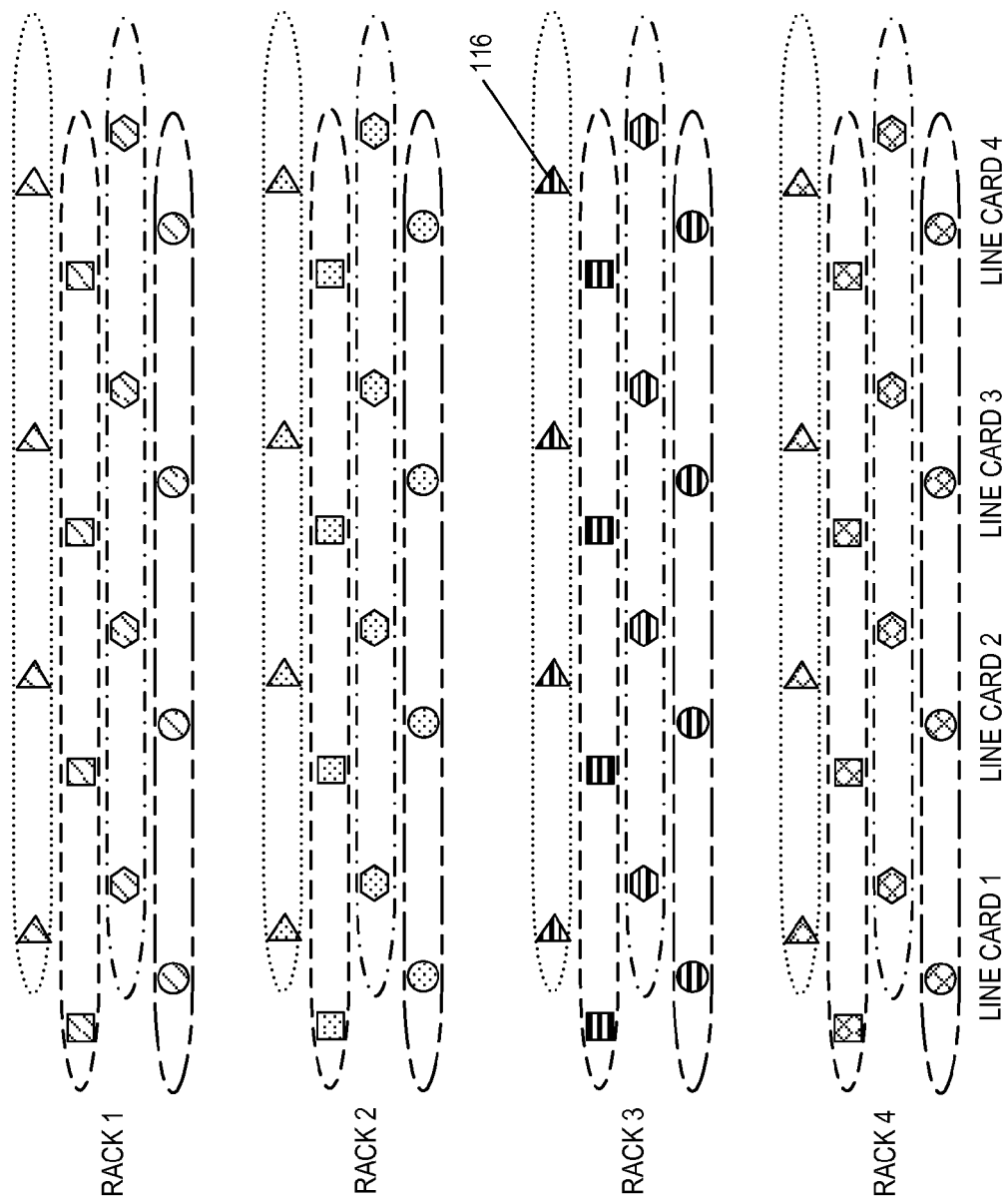

*Figure 7C*

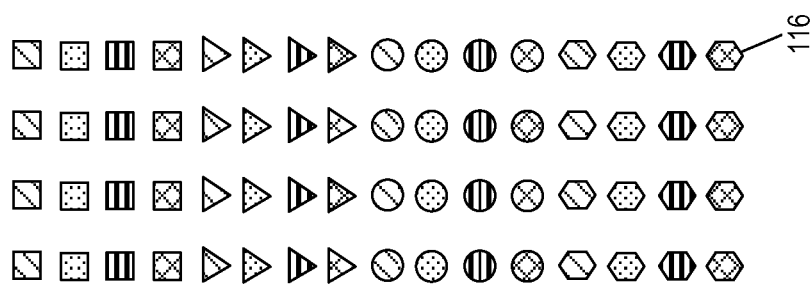

HIGH CONNECTIVITY MULTIPLE DIMENSION OPTICAL NETWORK IN GLASS

TECHNICAL FIELD

The present invention generally relates to optical networks, and more particularly relates to waveguide coupling for optical networks.

BACKGROUND

Optical interconnects are a viable technical solution for ultra-high speed and high density interconnects in datacom and telecom infrastructures. Optical interconnects also provide a business solution for replacement of costly and bulky electrical cables and backplanes. Currently, the Clos network and corresponding derivative architectures are widely used for high scalability systems. The Clos Network consists of 3 stages: ingress stage; middle stage; and egress stage. A single connection is provided between each ingress stage switch and each middle stage switch. Each middle stage switch is connected exactly once to each egress stage switch. Passive optical point-to-point interconnects are required for high performance and high connectivity, with minimum packet loss and latency, as well as high system resilience. An optical fiber shuffle can provide such modularized connectivity. Optical fiber shuffles offer cross-connect fibers from multiple ribbon inputs to reconfigure multiple ribbon outputs. However, the shuffle box has a bulky size and high cost. The installation of a variety of topologies is also required. In addition, conventional optical cross-connect switch solutions such as MEMS (microelectromechanical systems) based switches, thermal-optical PLC (programmable logic controller) based switches, or silicon photonics switches are expensive, have high latency, and offer low reliability in high density large scale ICT (information and communications technology) systems such as cloud computing, data center applications, Ethernet switches, etc.

SUMMARY

Embodiments described herein provide an optical cross-connect for optical communication networks. The optical cross-connect includes a block of a single continuous construction and material. Non-intersecting, continuous waveguides are formed within the block using direct laser writing technology. The waveguides extend from a first side of the block to an opposing second side of the block to provide optical interconnections between optical components disposed at both sides of the block. The optical cross-connect described herein is compact, has low cost, offers fast and flexible processing, has high connectivity, and readily extends to multiple dimension networks.

According to an embodiment of an optical communications system, the optical communications system comprises a first plurality of optical components having optical ports, a second plurality of optical components having optical ports, and an optical cross-connect. The optical cross-connect comprises a block of a single continuous construction and material having a first side adjacent the first plurality of optical components and a second side adjacent the second plurality of optical components and a plurality of non-intersecting, continuous waveguides formed within the block and extending from the first side of the block to the second side of the block. The refractive index of each waveguide is different than the surrounding material of the block. Each waveguide changes direction at least once within the block. The waveguides are optically aligned with the optical ports of the first plurality of optical components at the first side of the block and with the optical ports of the second plurality of optical components at the second side of the block.

According to an embodiment of a method of communicating optical signals via the optical communications system, the method comprises: providing the first and second plurality of optical components; interposing the optical cross-connect between the first and second plurality of optical components; and optically aligning the waveguides with the optical ports of the first plurality of optical components at the first side of the block and with the optical ports of the second plurality of optical components at the second side of the block.

According to an embodiment of an optical cross-connect for optical communication networks, the optical cross-connect comprises a block of a single continuous construction and material and a plurality of non-intersecting, continuous waveguides formed within the block and extending from a first side of the block to an opposing second side of the block. The refractive index of each waveguide is different than the surrounding material of the block. Each waveguide changes direction at least once within the block.

According to an embodiment of a method of manufacturing the optical cross-connect, the method comprises: providing a block of a single continuous construction and material; and applying focused femtosecond laser pulses to the block to change the refractive index within the block along different pathways, each pathway forming a non-intersecting, continuous waveguide within the block that extends from a first side of the block to an opposing second side of the block, each waveguide changing direction at least once within the block.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 6A and 6B illustrate an East-West full mesh network topology implemented by the optical cross-connect of FIG. 1.

FIGS. 7A through 7E illustrate a North-South full mesh network topology implemented by the optical cross-connect of FIG. 1.

DETAILED DESCRIPTION

Figure 1:
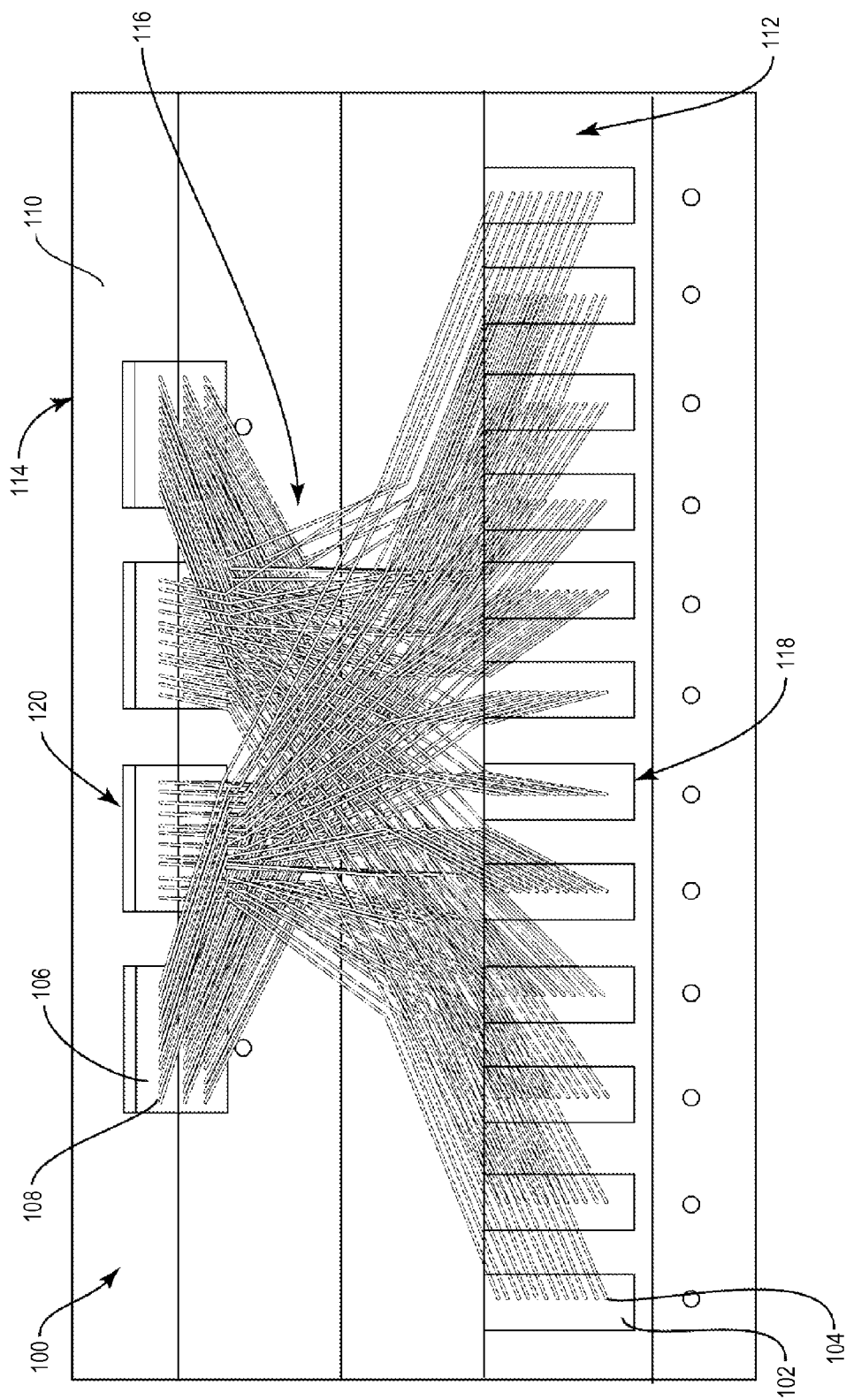
FIG. 1 is a schematic diagram of an embodiment of an optical communications system including optical components and an optical cross-connect for optically coupling different ones of the optical components, from the perspective of the ingress side of the optical cross-connect.
Figure 2:
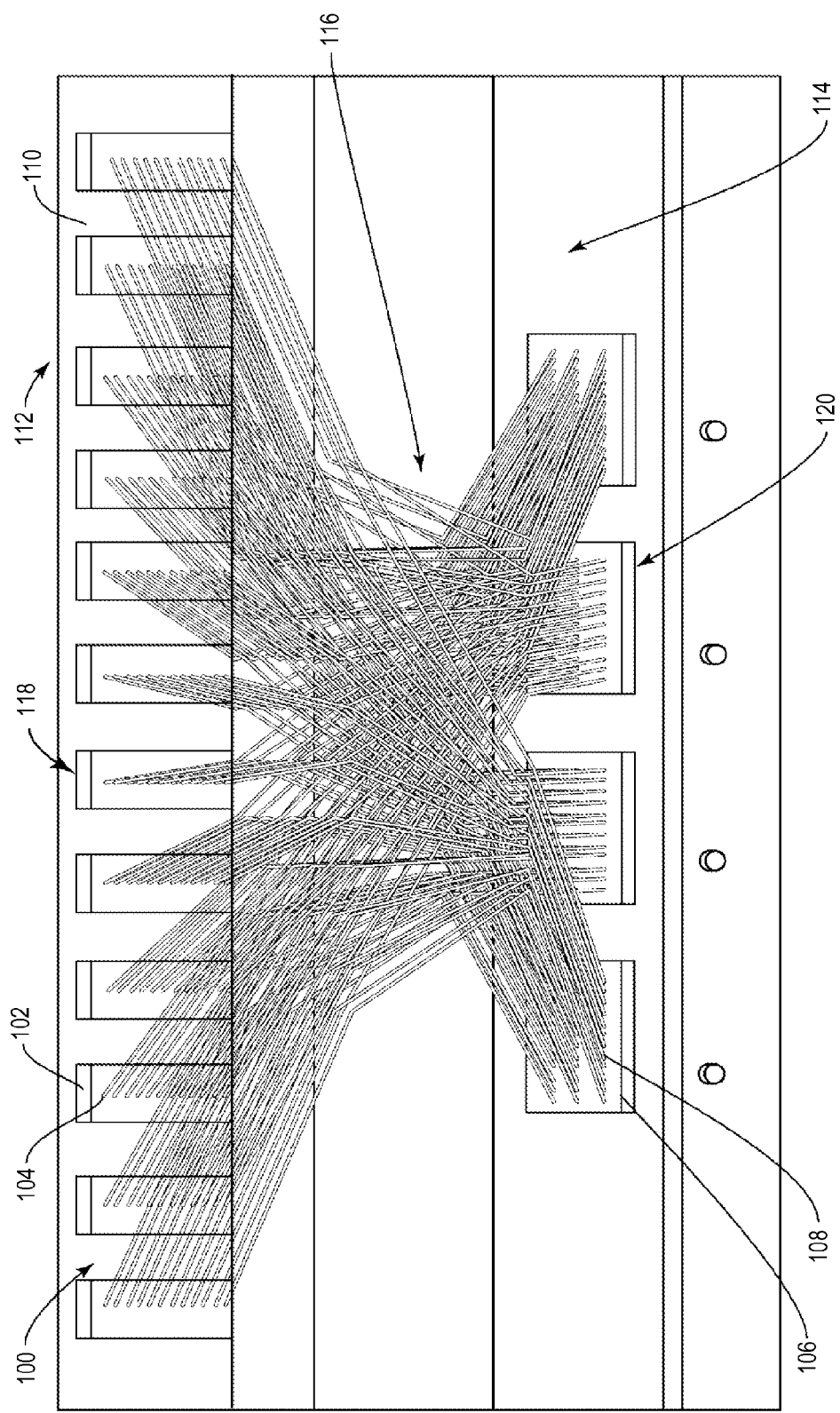
FIG. 2 is a schematic diagram of the optical communications system of FIG. 1, from the perspective of the egress side of the optical cross-connect.
Figure 3:
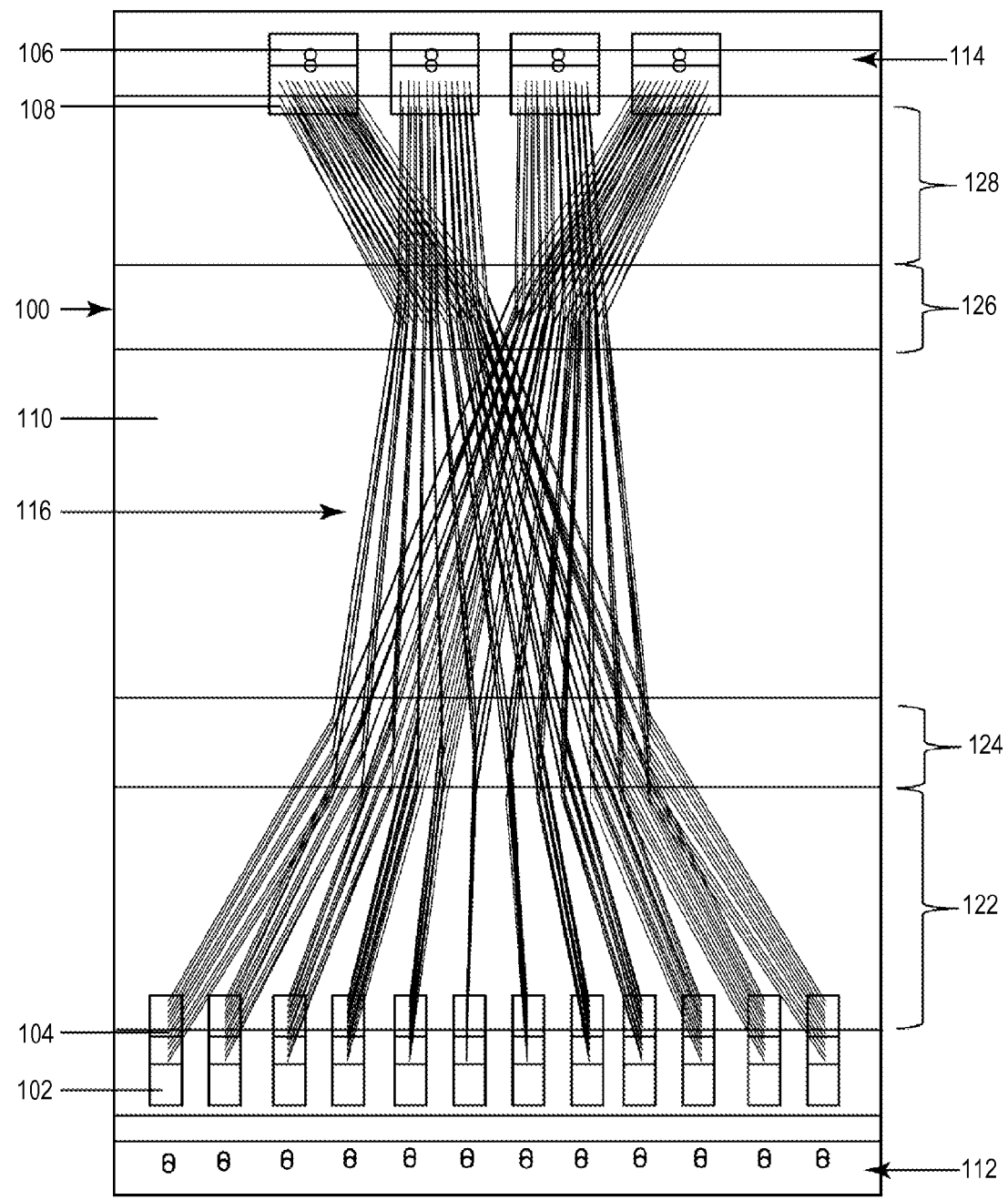
FIG. 3 is a top plan view of the optical communications system of FIG. 1.

FIG. 1 illustrates an embodiment of an optical communications system, viewed from the ingress side of an optical cross-connect 100 included in the system. FIG. 2 illustrates the optical communications system, viewed from the egress side of the optical cross-connect 100. FIG. 3 illustrates a top plan view of the optical cross-connect 100. The optical communications system comprises a first plurality of optical components 102 having optical ports 104 such as Mechanically Transferrable (MT)-type ferrules and a second plurality of optical components 106 having optical ports 108. The optical components 102, 106 are generically represented as boxes in FIG. 1, and can be optical switches, logic devices with an optical input/output interface such as processor(s), memory, etc. or other types of optical transmit/receive components employed in datacom and telecom infrastructures. In one embodiment, the optical components 102, 106 are optical network line cards e.g. of the kind typically included in optical switch blades.

The optical cross-connect 100 included in the optical communications system is interposed between the first plurality of optical components 102 and the second plurality of optical components 106. The optical cross-connect 100 comprises a block 110 of a single continuous construction and material such as fused silica glass, silicon nitride, etc. The block 110 has a first side 112 adjacent the first plurality of optical components 102 and a second side 114 adjacent the second plurality of optical components 106. A plurality of non-intersecting, continuous waveguides 116 are formed within the block 110 and extend from the first side 112 of the block 110 to the second side 114 of the block 110. The refractive index of each waveguide 116 is different than the surrounding material of the block 110, and each waveguide 116 changes direction at least once within the block 110. In one embodiment, at least some of the waveguides 116 transition between at least two different vertical and/or horizontal planes within the block 110.

The waveguides 116 formed in the cross-connect 100 are optically aligned with the optical ports 104 of the first plurality of optical components 102 at the first side 112 of the block 110 and with the optical ports 108 of the second plurality of optical components 106 at the second side 114 of the block 110, enabling optical coupling between the first and second plurality of optical components 102, 106. The waveguides 116 are single mode in one embodiment. The block 110 can include a single layer or multiple layers of waveguides 116. In the embodiment shown in FIG. 1, each waveguide 116 optically connects one optical port 104 of the first plurality of optical components 102 to one optical port 108 of the second plurality of optical components 106. The waveguides 116 can be arranged in the block 110 to implement any desired type of optical interconnect topology such as a full mesh point-to-point topology. Broadly, the optical cross-connect 100 can interconnect optical blades, racks, and chassis in a scalable and flexible fashion.

In a further embodiment, the optical ports 104 of the first plurality of optical network line cards 102 are included in vertically oriented connectors 118 and the optical ports 108 of the second plurality of optical network line cards 106 are included in horizontally oriented connectors 120 as shown in FIG. 1. The waveguides 116 are optically aligned with the plurality of vertically oriented connectors 118 at the first side 112 of the block 110 and with the plurality of horizontally oriented connectors 120 at the second side 114 of the block 110. The number of vertically oriented connectors 118 can be different than the number of horizontally oriented connectors 120 as shown in FIG. 1, or the same, depending on the type of system and connectors.

Figure 4:
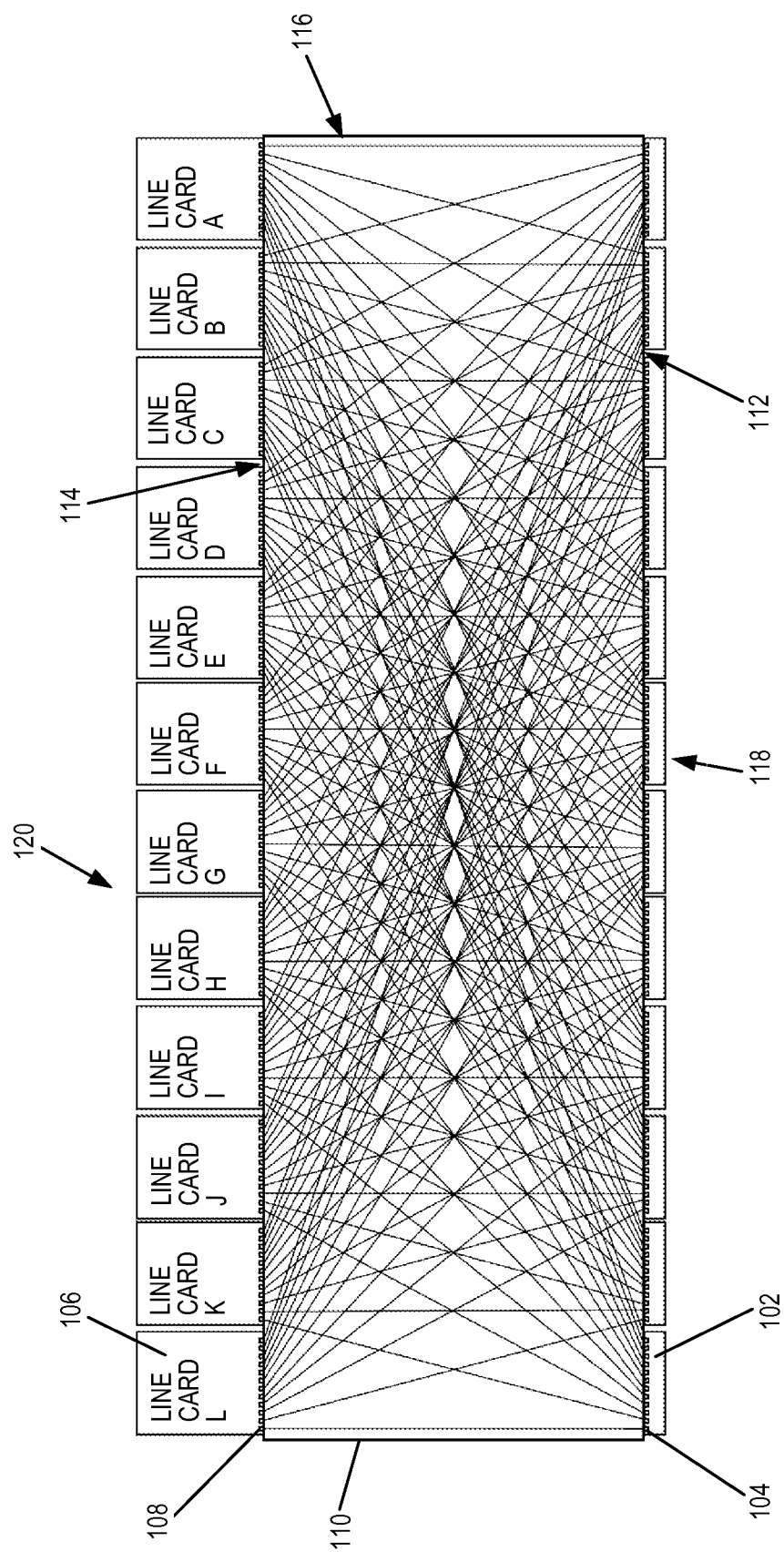
FIG. 4 is a schematic diagram of a full-mesh network topology implemented by the optical cross-connect of FIG. 1.

In the case of the optical components 102, 106 being optical network line cards, the optical ports 104 of the first plurality of optical network line cards 102 can be ingress ports and the optical ports 108 of the second plurality of optical network line cards 106 can be egress ports. In this configuration, the waveguides 116 of the optical cross-connect 100 optically connect the ingress ports 104 of the first plurality of optical network line cards 102 to the egress ports 108 of the second plurality of optical network line cards 106 in a full mesh point-to-point topology as illustrated in FIG. 4.

In one embodiment, the optical line cards 102, 106 are housed in racks and each line card 102, 106 populated with N ports 104, 108. For example, the optical line cards 102, 106 can be high-speed SERDES (serializer/deserializer) enabled by optical transmitters (TXs) and receivers (RXs). The line cards 102, 106 can be homogeneous in terms of configuration and the number of SERDES enabled by optical TXs and RXs. The number of line cards 102, 106 to be interconnected in each rack is L. Interconnects are established between $TX_{i,j}$ and $RX_{p,q}$ by the optical cross-connect 100, where i and p represent line card number $\in \{1, 2, \ldots, L\}$ and j and q represent the TX and RX number $\in \{1, 2, \ldots, N\}$ on each line card 102, 106.

In one embodiment, an interconnect topology is created for the line cards 102, 106 on the same rack, by connecting $TX_{i,j}$ to $RX_{p,q}$ where i=q and j=p. The intra-rack data traffic is East-West bound in the following example. The number of dedicated TX/RX lane(s) to be interconnected to the other line card on the same rack is defined as $O_L$ and $O_L \geq 1$. The line card-to-line card full-mesh interconnect with TXs and RXs is shown in FIG. 4. In this example L=12, N=12, and $O_L$=1. Each line card 102, 106 has a dedicated TX/RX lane for all of the other line cards 102, 106. The waveguides 116 formed in the optical cross-connect 100 implement the full-mesh interconnect between the TXs and the RXs.

As shown in FIG. 3, the block 110 of the optical cross-connect 100 can have an aggregation region 122, one or more transposition regions 124, 126 and a de-aggregation region 128. The aggregation region 122 is disposed adjacent the first plurality of line cards 102 (i.e. the ingress line cards) and the de-aggregation region 128 is disposed adjacent the second plurality of line cards 106 (i.e. the egress line cards). The waveguides 116 are aggregated (spaced) closer together in the aggregation region 122 of the block 110, transposed in at least one of a different direction and a different plane in each transposition region 1224, 126 of the block 110, and disaggregated (spaced) further apart from one another in the de-aggregation region 128 of the block 110 to implement the desired interconnect between the TXs and the RXs e.g. such as full-mesh as shown in FIG. 3. The transposition region(s) 124, 126 of the block 110 are interposed between the aggregation and de-aggregation regions 122, 128 of the block 110. The optical cross-connect block 110 can have multiple transposition stages to aggregate and disaggregate the waveguides 116 (two transposition regions 124, 126 are shown in FIG. 3 by way of example).

FIGS. 5A through 5E illustrate the configuration of the waveguides 116 at different points along the optical cross-connect block 110, to accommodate the interconnections shown in FIGS. 1-3, for L=6 line cards per rack, N=6 optical transmitters (TXs) and receivers (RXs), and $O_L=1$ dedicated TX/RX lane(s) to be interconnected to the other line card on the same rack.

Figure 5A:
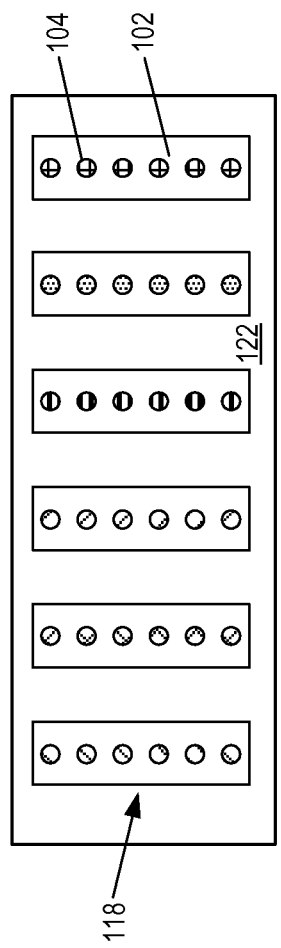
FIGS. 5A through 5E illustrate an embodiment of a configuration of the waveguides formed in the optical cross-connect of FIG. 1, at different points along the optical cross-connect.

FIG. 5A shows the optical transmitters $[TX_{1,j}]$, $[TX_{2,j}]$, $[TX_{3,j}]$, $[TX_{4,j}]$, $[TX_{5,j}]$, $[TX_{6,j}]$, $j \in \{1,2,3,4,5,6\}$ aggregated into 6 vertical connectors 118 interfacing with the aggregation region 122 of the optical cross-connect block 110. Each ingress connector 118 has 12 ports 102 with 12 fibers, and 12 vertical rows in 12 horizontal planes in this example.

Figure 5B:
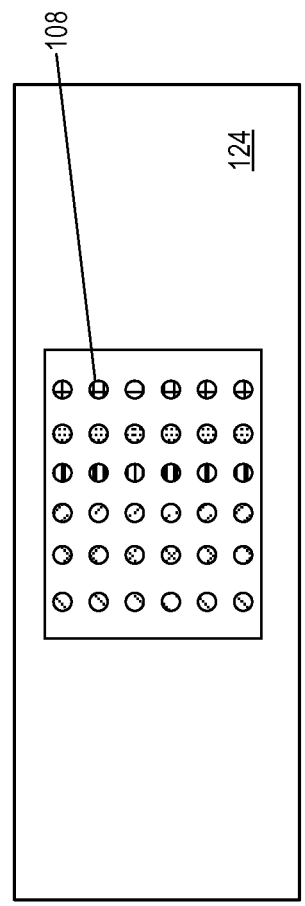

FIG. 5B shows all 36 lanes aggregated in the middle of a first transposition region 124 of the optical cross-connect block 110 for waveguide regrouping. The first transposition region 124 aggregates the waveguides 116 into a very close area to facilitate a second transposition. From the first transposition region 124 toward the second transposition region 126, the rows are separated into two directions, i.e. rows with odd numbers to left and rows with even numbers to right.

Figure 5C:
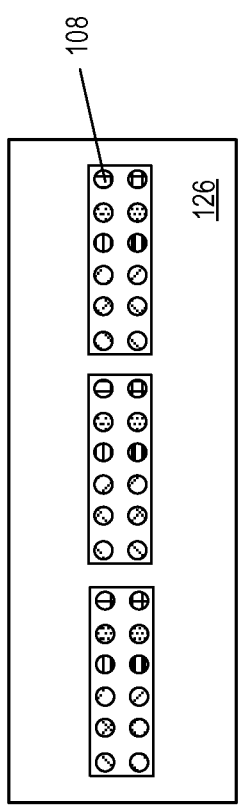

FIG. 5C shows the second transposition region 126 of the optical cross-connect block 110. The second transposition region 126 further disaggregates the waveguide rows in an organized fashion. For example, the waveguides 116 associated with optical transmitters $[TX_{i,1} TX_{i,2}]$ $i \in \{1,2,3,4,5,6\}$ are grouped together in a left part of the second transposition region 126, the waveguides 116 associated with optical transmitters $[TX_{i,3} TX_{i,4}]$ are grouped together in a middle part of the second transposition region 126, and the waveguides 116 associated with optical transmitters $[TX_{i,5} TX_{i,6}]$ are grouped together in the right part of the second transposition region 126. This waveguide routing scheme results in rows #1, 5, 9 being assigned to egress port #1, rows #2, 6, 10 assigned to egress port #2, rows #3, 7, 11 assigned to egress port #3, and rows #4, 8, 12 assigned to egress port #4.

Figure 5D:
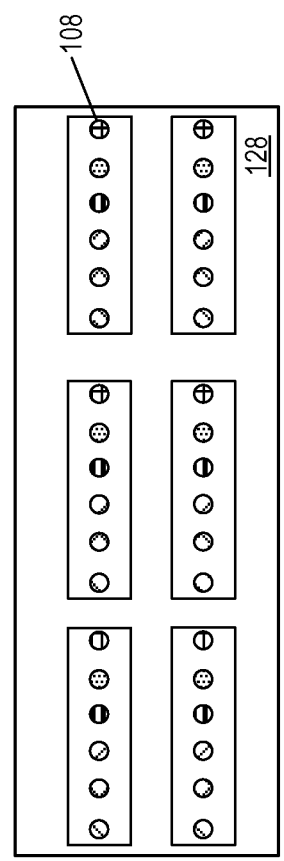

FIG. 5D shows the de-aggregation region 128 of the optical cross-connect block 110, in which the waveguides 116 associated with optical transmitters $[TX_{i,1}]$, $[TX_{i,3}]$, $[TX_{i,5}]$ $i \in \{1,2,3,4,5,6\}$ are disaggregated in the upper part of the de-aggregation region 128 and the waveguides 116 associated with optical transmitters $[TX_{i,2}]$, $[TX_{i,4}]$, $[TX_{i,6}]$ are disaggregated in the lower part of the de-aggregation region 128. The fibers are aggregated into 3 high density egress connectors 120 with 36 fibers in each connector 120. Each row of the egress connectors contains 12 ports 108 issued from the 12 different ingress ports 104, with one channel from each ingress port 104. For example, there are three rows in egress port #1, in which the first row aggregates the channels in row #1 from all the ingress ports 104, the second row aggregates the channels in row #5 from all the ingress ports 104, and the third row aggregates the channels in row #9 from all the ingress ports 104.

Figure 5E:
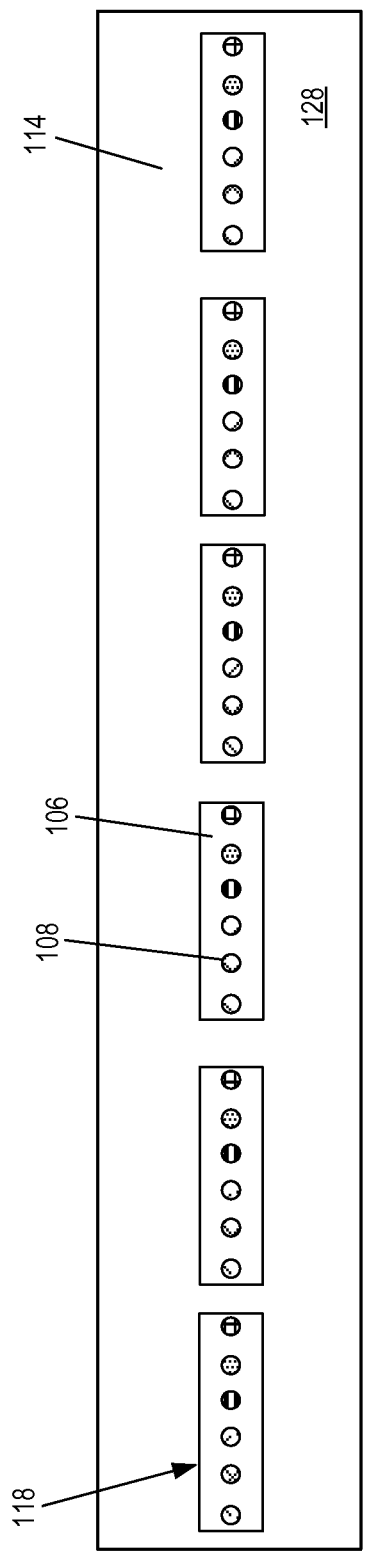

FIG. 5E shows another embodiment where the lanes at the egress side 114 of the optical cross-connect block 110 are disaggregated into paralleled connectors 120. The optical cross-connect block 110 examples shown in FIGS. 5A through 5E yields a 12×12 (12 vertical ports with 12 fibers) to 4×36 (4 horizontal ports with 3×12 fibers) full mesh fabric optical interconnect. In yet another embodiment, OL>1 and the topology in use duplicate the number of parallel waveguides 116 with the same aggregation, transposition and disaggregation stages.

The optical cross-connect embodiments previously described herein can be extended to three-dimensional optical network interconnects. For example, each line card 102, 106 can be populated with N ports 104, 108 of high-speed SERDES enabled by optical transceivers (TX, RX). The number of line cards 102, 106 to be interconnected in each rack is L, and the number of racks (with L line cards) is R. All racks and line cards can be treated as similar in terms of the configuration, the number of SERDES enabled with optical TX and RX on each line card 102, 106, and the number of line cards 102, 106 on each rack.

Interconnects are established between $TX_{r,i,j}$ and $RX_{s,p,q}$ where r and s are the rack number $\in \{1, 2, \ldots, R\}$, i and p are the line card number $\in \{1, 2, \ldots, L\}$ in each rack, and j and q are the TX and RX number $\in \{1, 2, \ldots, N\}$ on each line card 102, 106. For East-West bound data traffic, an interconnect topology is provided for the line cards 102, 106 on the same rack, by connecting $TX_{r,i,j}$ to $RX_{s,p,q}$ using the optical cross-connect 100 where r=s, i=q and j=q. The number of dedicated TX/RX lane(s) to be interconnected to the other line cards 102, 106 on the same rack is defined as $O_L$ and $O_L \geq 1$. For North-South bound data traffic, an interconnect topology is provided for connecting all the racks, by connecting $TX_{r,i,j}$ to $RX_{s,p,q}$ using the optical cross-connect 100 where r≠s, i=p and j=q. The number of dedicated TX/RX lane(s) to be interconnected to the other racks with the same line card number and TX/RX number is defined as $O_R$ and $O_R \geq 1$.

Figure 6B:
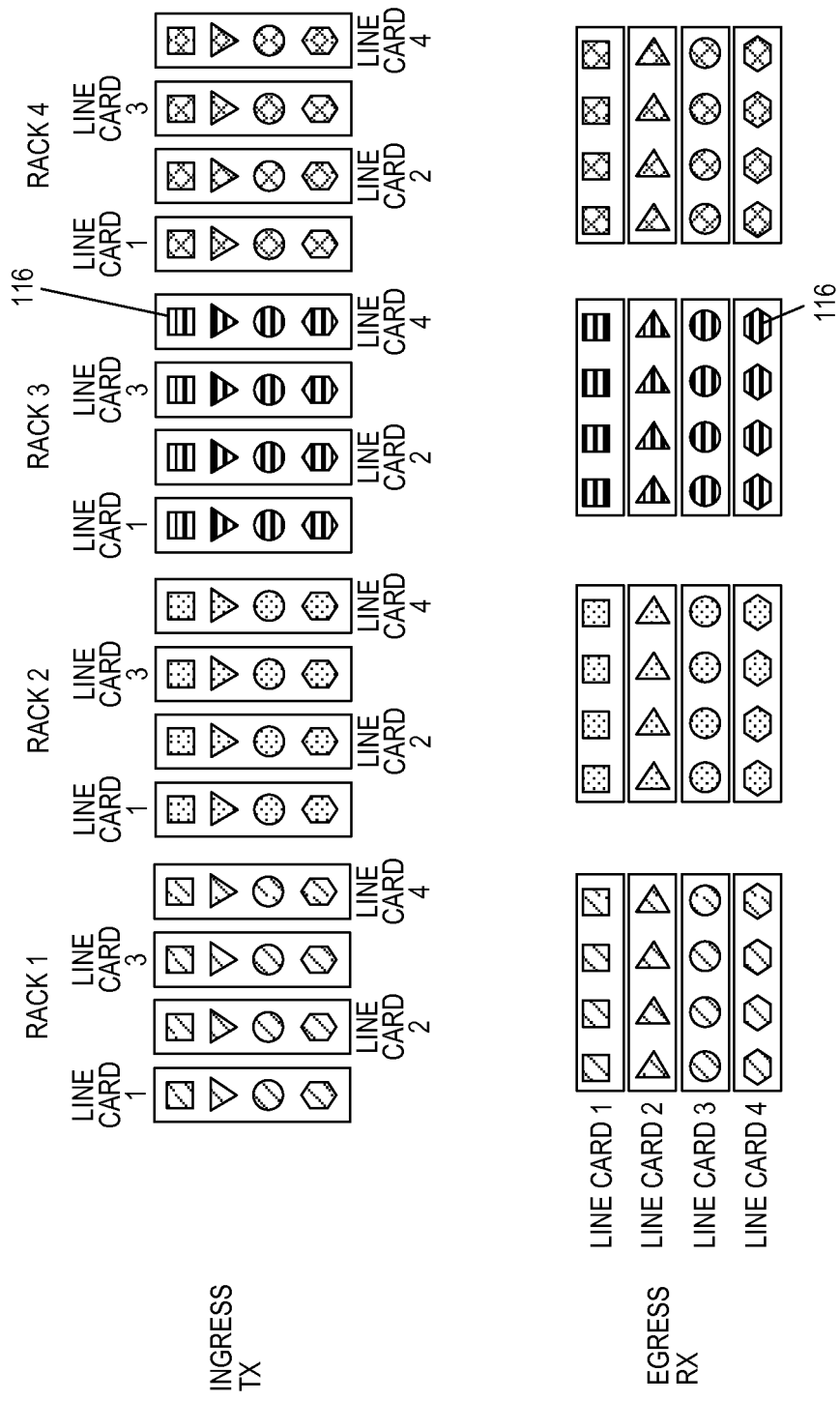

FIGS. 6A and 6B illustrate an East-West full mesh interconnect topology implemented by the optical cross-connect 100, for R=4 racks, L=4 line cards per rack, N=4 optical transmitters (TXs) and receivers (RXs), $O_L=1$ dedicated TX/RX lane(s) to be interconnected to the other line card on the same rack, and $O_R=1$ dedicated TX/RX lane(s) to be interconnected to the other racks with the same line card number and TX/RX number. FIG. 6A shows the logical East-West data flow pattern, and FIG. 6B shows the ingress and egress line cards 102, 106 included in the different racks. According to this embodiment, the East-West full mesh network can be formed with direct parallel waveguides 116 using the optical cross-connect 100 as no interleaving and waveguide position permutation is required. The different waveguide shapes and shading shown in FIGS. 6A and 6B merely distinguish the racks, line cards and the TXs/RXs.

Figure 7A:
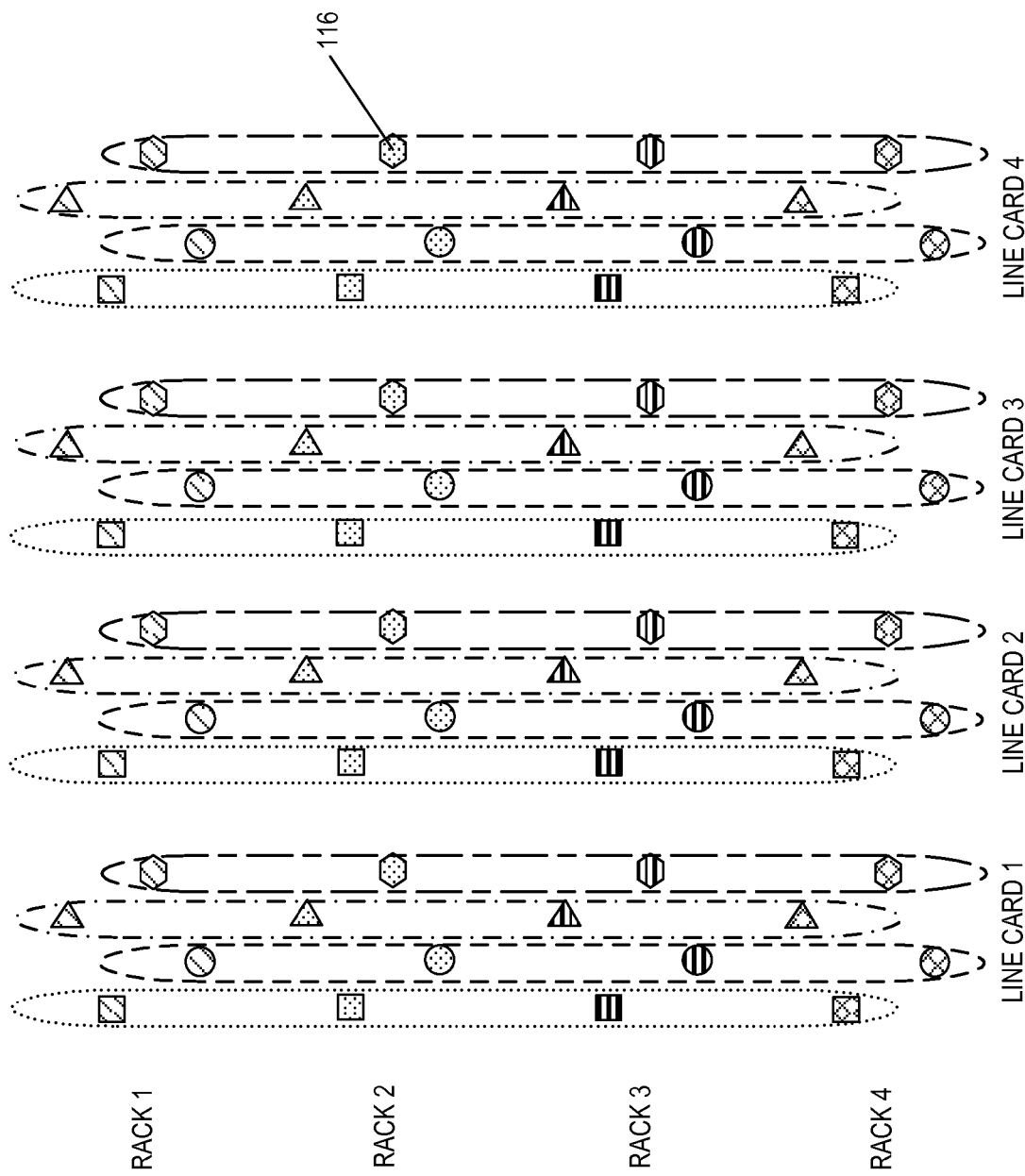
Figure 7B:
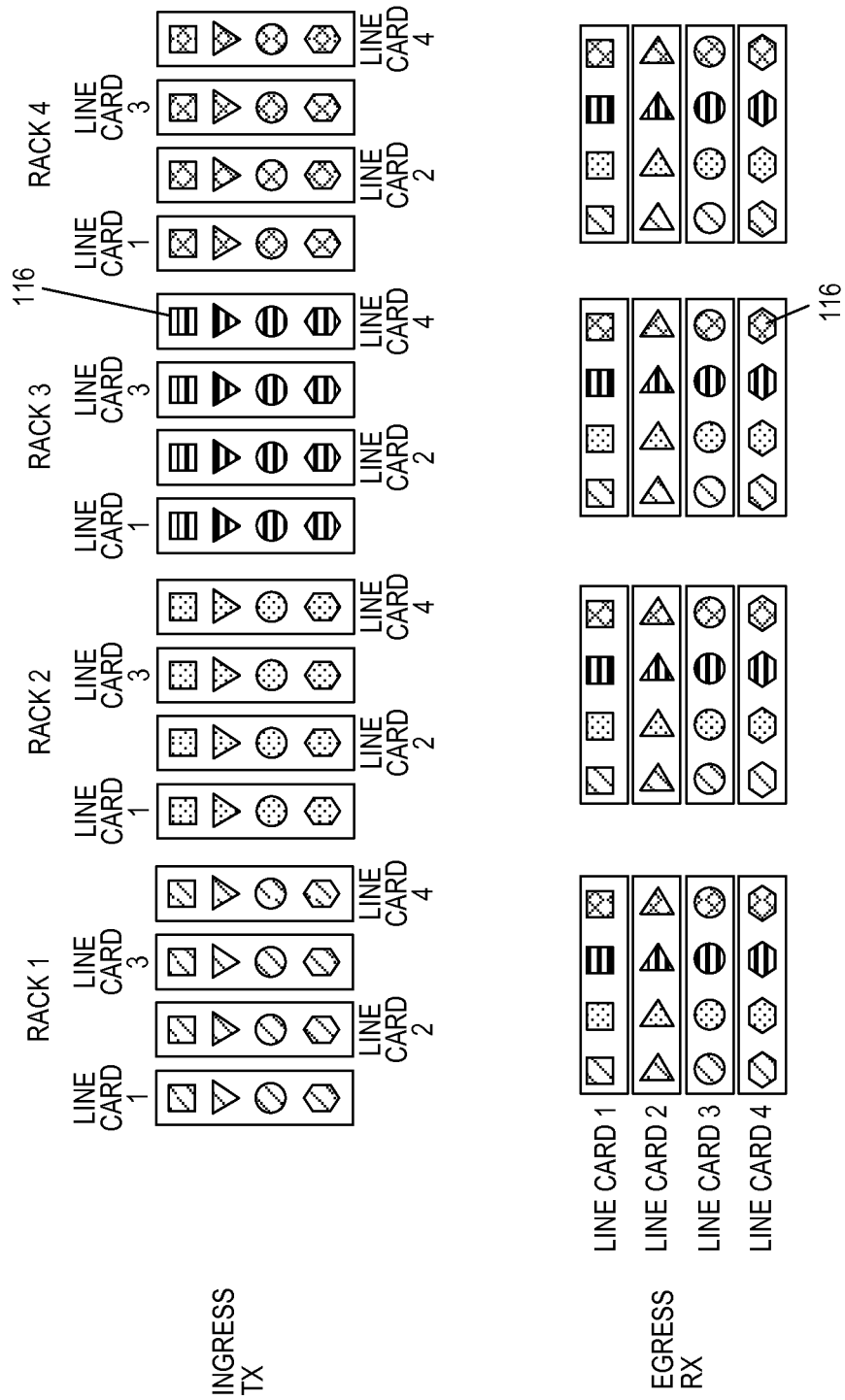
Figure 7C:
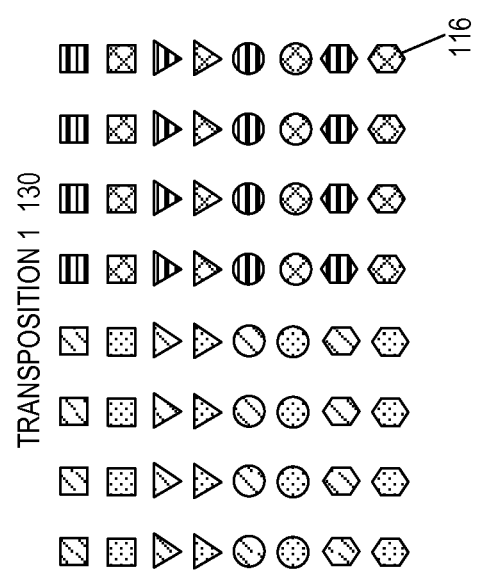
Figure 7E:
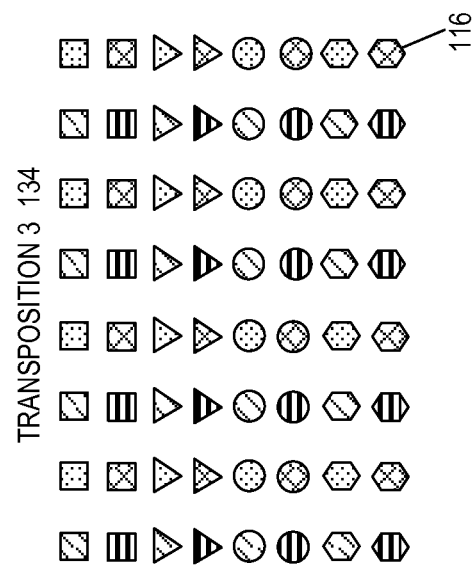

FIGS. 7A through 7E illustrate a North-South full mesh implemented by the optical cross-connect, for R=4 racks, L=4 line cards per rack, N=4 optical transmitters (TXs) and receivers (RXs), $O_L=1$ dedicated TX/RX lane(s) to be interconnected to the other line card on the same rack, and $O_R=1$ dedicated TX/RX lane(s) to be interconnected to the other racks with the same line card number and TX/RX number. FIG. 7A shows the logical North-South data flow pattern, and FIG. 7B shows the ingress and egress line cards 102, 106 included in the different racks. FIGS. 7C through 7E illustrate the configuration of the waveguides 116 at different points along the optical cross-connect block 110, to accommodate the interconnections shown in FIGS. 7A and 7B.

In a first transposition region 130 of the optical cross-connect block 110, the rows of waveguides 116 are grouped towards the center of the first transposition region 130 as shown in FIG. 7C. Particularly in this example, waveguide columns #1, 2, 3, and 4 are moved to the upper right part of the first transposition region 130, waveguide columns #5, 6, 7, 8 are moved to the lower right, waveguide columns #9, 10, 11, 12 are moved to the upper left, and waveguide columns #13, 14, 15, 16 are moved to the lower left.

In a second transposition region 132 of the optical cross-connect 100, the waveguide columns are further regrouped towards the center of the second transposition stage 132 as shown in FIG. 7D. Particularly in this example, waveguide columns #1, 2, 3, 4 are moved to the upper right part of the second transposition stage 132 and waveguide columns #5, 6, 7, 8 are moved to the lower left.

In a third transposition region 134 of the optical cross-connect 100, the waveguide rows are disaggregated and interleaved as shown in FIG. 7E. Particularly in this example, waveguide rows #1, 3, 5, 7, 9, 11, 13, 15 are moved to the lower left part of the third transposition stage 134 and waveguide rows #2, 4, 6, 8, 10, 12, 14, 16 are moved to the upper right.

At the egress side 114 of the optical cross-connect 100, the waveguide rows are interleaved again and disaggregated into separate ports as shown in the bottom half of FIG. 7B. Particularly, waveguide rows #1, 3, 5, 7 are moved to the lower left and waveguide columns #2, 4, 6, 8 are moved to the upper right.

The East-West network topology and the North-South network topology can be both enabled in the same optical cross-connect as the ingress and egress configurations are the same. In another embodiment, the East-West network topology and the North-South network topology can be enabled in different optical cross-connects for different integration purposes. In another embodiment if OL>1 or OR>1, the topology in use can duplicate the number of parallel waveguides with the same aggregation, transposition and disaggregation.

3D network implementation in glass can be viewed as an extension from the 2D network. Each TX/RX pair is moved from 2D to a 3D full mesh network. The latency is doubled at most in the worst case, and only two network interconnects are required in glass to create the 3D full mesh connectivity, which can also be implemented in the same glass bulk if desired. The basic approach to create 3D and 2D networks is similar and can extend to higher dimension network topologies. In another embodiment, other types of optical interconnect networks such as Torus, Hyper-cube, etc. can be created with the same or similar approach.

Figure 8:
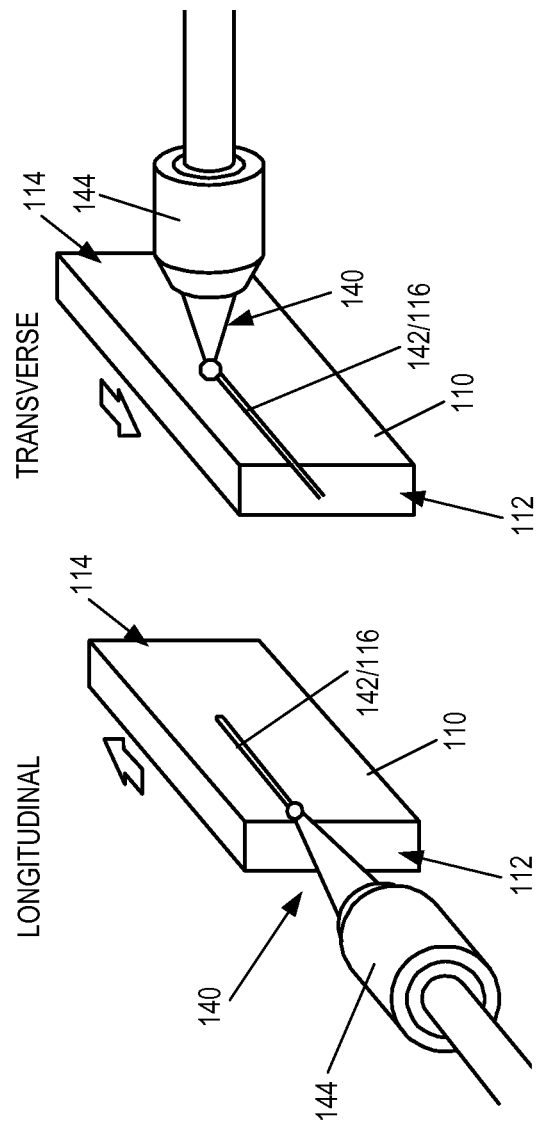
FIG. 8 illustrates an embodiment of a method of manufacturing the optical cross-connect of FIG. 1.

FIG. 8 illustrates an embodiment of a method of manufacturing the optical cross-connect 100 described herein. The method comprises providing a transparent block 110 of a single continuous construction and material such as fused silica glass, silicon nitride, etc. and applying focused femtosecond laser pulses 140 to the block 110 to change the refractive index within the block 110 along different pathways 142. Each pathway 142 forms a non-intersecting, continuous waveguide 116 within the block 110 that extends from a first side 112 of the block 110 to an opposing second side 114 of the block 110. Each waveguide 116 changes direction at least once within the block 110. The waveguides 116 can change direction by changing the energy and focal point of the femtosecond laser pulses 140 during fabrication e.g. so that at least some of the waveguides 116 transition between at least two different planes within the block 110.

Femtosecond laser pulses focused beneath the surface of a dielectric are absorbed through nonlinear photoionization mechanisms, giving rise to a permanent structural modification with dimensions on the order of a micrometer (micron). At low pulse energies, the modification in many glasses is a smooth refractive index change, enabling photonic device fabrication. Because femtosecond laser pulses are nonlinearly absorbed to deposit energy within the focal volume, the technique can be applied to tailor the refractive index of a variety of glasses, polymers, and crystalline materials along 3D pathways.

In longitudinal writing as illustrated by the left-hand side of FIG. 8, the block 110 is scanned in parallel, either toward or away from the incident laser 140. However, the waveguide length is limited by the working distance of the lens 144, which for a typical focusing objective is approximately 5 mm. In transverse writing as illustrated by the right-hand side of FIG. 8, the block 110 is scanned orthogonally relative to the incoming laser 140. The working distance does not restrict the length of the resulting waveguides 116, and structures may be formed over a depth range of several millimeters, which provides adequate flexibility to provide 3D optical circuits. Multiple scans can be performed at sub-micron intervals.

Femtosecond laser writing also results in relatively low induced refractive-index change of $\Delta n \sim 0.01$ that imposes large limiting bend radii of R>20 mm. The propagation losses in waveguides 116 fabricated with femtosecond laser pulses 140 are about 0.1 to 0.2 dB/cm. Femtosecond laser writing yields symmetric, uniform waveguides 116 with low loss. Femtosecond laser writing enables high density waveguide-to-fiber connectors, and formation of 3D horizontal and vertical waveguides 116. Waveguide crossing and twisting is preferably avoided. Each transposition region 124, 126, 130, 132, 134 of the optical cross-connect 100 can be processed separately as individual blocks, or preferably processed as a single piece. Waveguide curvature can be optimized without sharp turns and bends. Femtosecond laser writing yields waveguide dimensions in the same order of the core size of a single mode fiber, with a typical diameter of about 8 to 9 µm. Other diameters are possible. A minimum spacing between waveguides 116 in the order of a few µm can be realized via femtosecond laser writing to avoid channel crosstalk. Smaller or larger inter-waveguide spacing is possible.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An optical communications system, comprising:
a first plurality of optical components having optical ports;
a second plurality of optical components having optical ports; and
an optical cross-connect comprising:
a block of a single continuous construction and material having a first side adjacent the first plurality of optical components and a second side adjacent the second plurality of optical components; and
a plurality of non-intersecting, continuous waveguides formed within the block and extending from the first side of the block to the second side of the block, the refractive index of each waveguide being different than the surrounding material of the block, each waveguide changing direction at least once within the block, and at least two of the waveguides crossing each other in different horizontal planes, wherein each of the different horizontal planes intersects both the first side of the block and the second side of the block, and wherein the different horizontal planes do not intersect with each other, at least within the block, wherein the waveguides are optically aligned with the optical ports of the first plurality of optical components at the first side of the block and with the optical ports of the second plurality of optical components at the second side of the block.

2. The optical communications system of claim 1, wherein each waveguide optically connects one optical port of the first plurality of optical components to one optical port of the second plurality of optical components.

3. The optical communications system of claim 1, wherein at least some of the waveguides transition between at least two of the different horizontal planes within the block.

4. The optical communications system of claim 1, wherein the first plurality of optical components are optical network line cards and the second plurality of optical components are optical network line cards.

5. The optical communications system of claim 4, wherein the optical ports of the first plurality of optical network line cards are egress ports and the optical ports of the second plurality of optical network line cards are ingress ports.

6. The optical communications system of claim 5, wherein the waveguides of the optical cross-connect optically connect the egress ports of the first plurality of optical network line cards to the ingress ports of the second plurality of optical network line cards in a full mesh point-to-point topology.

7. The optical communications system of claim 4, wherein the optical ports of the first plurality of optical network line cards are included in a plurality of vertically oriented connectors, wherein the optical ports of the second plurality of optical network line cards are included in a plurality of horizontally oriented connectors, and wherein the waveguides are optically aligned with the plurality of vertically oriented connectors at the first side of the block and with the plurality of horizontally oriented connectors at the second side of the block.

8. The optical communications system of claim 7, wherein the number of vertically oriented connectors is different than the number of horizontally oriented connectors.

9. The optical communications system of claim 1, wherein the waveguides are aggregated closer together in a first region of the block, transposed in at least one of a different direction and a different plane in a second region of the block, and disaggregated further apart from one another in a third region of the block, the second region being interposed between the first and third regions.

10. A method of communicating optical signals via an optical communications system, the method comprising:
providing a first plurality of optical components having optical ports and a second plurality of optical components having optical ports;
interposing an optical cross-connect between the first and second plurality of optical components, the optical cross-connect comprising:
a block of a single continuous construction and material having a first side adjacent the first plurality of optical components and a second side adjacent the second plurality of optical components; and
a plurality of non-intersecting, continuous waveguides formed within the block and extending from the first side of the block to the second side of the block, the refractive index of each waveguide being different than the surrounding material of the block, each waveguide changing direction at least once within the block, and at least two of the waveguides crossing each other in different horizontal planes, wherein each of the different horizontal planes intersects both the first side of the block and the second side of the block, and wherein the different horizontal planes do not intersect with each other, at least within the block; and
optically aligning the waveguides with the optical ports of the first plurality of optical components at the first side of the block and with the optical ports of the second plurality of optical components at the second side of the block.

11. The method of claim 10, wherein each waveguide optically connects one optical port of the first plurality of optical components to one optical port of the second plurality of optical components.

12. The method of claim 10, wherein at least some of the waveguides transition between at least two of the different horizontal planes within the block.

13. The method of claim 10, wherein the first plurality of optical components are optical network line cards and the second plurality of optical components are optical network line cards.

14. The method of claim 13, wherein the optical ports of the first plurality of optical network line cards are egress ports and the optical ports of the second plurality of optical network line cards are ingress ports.

15. The method of claim 14, wherein the waveguides of the optical cross-connect optically connect the egress ports of the first plurality of optical network line cards to the ingress ports of the second plurality of optical network line cards in a full mesh point-to-point topology.

16. The method of claim 13, wherein the optical ports of the first plurality of optical network line cards are included in a plurality of vertically oriented connectors, wherein the optical ports of the second plurality of optical network line cards are included in a plurality of horizontally oriented connectors, and wherein the waveguides are optically aligned with the plurality of vertically oriented connectors at the first side of the block and with the plurality of horizontally oriented connectors at the second side of the block.

17. The method of claim 16, wherein the number of vertically oriented connectors is different than the number of horizontally oriented connectors.

18. The method of claim 10, wherein the waveguides are aggregated closer together in a first region of the block, transposed in at least one of a different direction and a different plane in a second region of the block, and disaggregated further apart from one another in a third region of the block, the second region being interposed between the first and third regions.

19. An optical cross-connect for optical communication networks, comprising:
a block of a single continuous construction and material; and
a plurality of non-intersecting, continuous waveguides formed within the block and extending from a first side of the block to an opposing second side of the block,
wherein the refractive index of each waveguide is different than the surrounding material of the block,
wherein each waveguide changes direction at least once within the block, and
wherein at least two of the plurality of non-intersecting, continuous waveguides cross each other in different horizontal planes, wherein each of the different horizontal planes intersects both the first side of the block and the opposing second side of the block, and wherein the different horizontal planes do not intersect with each other, at least within the block.

20. The optical cross-connect of claim 19, wherein at least some of the waveguides transition between at least two of the different horizontal planes within the block.

21. A method of manufacturing an optical cross-connect for optical communication networks, the method comprising:
- providing a block of a single continuous construction and material;
- applying focused femtosecond laser pulses to the block to change the refractive index within the block along different pathways, each pathway forming a non-intersecting, continuous waveguide within the block that extends from a first side of the block to an opposing second side of the block, each waveguide changing direction at least once within the block; and
- changing the energy and focal point of the applied focused femtosecond laser pulses such that at least some of the waveguides transition between at least two different planes within the block.

\* \* \* \* \*

UNITED STATES PATENT AND TRADEMARK OFFICE
CERTIFICATE OF CORRECTION

PATENT NO. : 9,124,959 B2  
APPLICATION NO. : 13/959249  
DATED : September 1, 2015  
INVENTOR(S) : Xu et al.

Page 1 of 1

It is certified that error appears in the above-identified patent and that said Letters Patent is hereby corrected as shown below:

In the specification

Column 4, Line 53, delete "1224, 126" and insert -- 124, 126 --, therefor.

Signed and Sealed this
Second Day of August, 2016

Michelle K. Lee
*Director of the United States Patent and Trademark Office*